United States Patent
Dubois et al.

(10) Patent No.: US 8,123,133 B2
(45) Date of Patent: Feb. 28, 2012

(54) PROTECTION DEVICE FOR AN ELECTRONIC CARD

(75) Inventors: Eric Dubois, Neuilly sur Seine (FR); Sylvain Barneron, Neuilly sur Seine (FR)

(73) Assignee: Ingenico France, Neuilly-sur-Seine (FR)

( * ) Notice: Subject to any disclaimer, the term of this patent is extended or adjusted under 35 U.S.C. 154(b) by 183 days.

(21) Appl. No.: 12/443,973

(22) PCT Filed: Oct. 2, 2007

(86) PCT No.: PCT/EP2007/060471
§ 371 (c)(1),
(2), (4) Date: Jul. 14, 2009

(87) PCT Pub. No.: WO2008/040737
PCT Pub. Date: Apr. 10, 2008

(65) Prior Publication Data
US 2009/0321302 A1   Dec. 31, 2009

(30) Foreign Application Priority Data
Oct. 2, 2006   (FR) ...................................... 06 08620

(51) Int. Cl.
*G06K 7/00* (2006.01)
*G06K 19/06* (2006.01)

(52) U.S. Cl. ....................................... 235/486; 235/492

(58) Field of Classification Search .................. 235/486, 235/492; 206/701, 706, 710; 361/600, 679.02, 361/679.57, 737, 800, 801, 820; 220/315, 220/324, 325
See application file for complete search history.

(56) References Cited

U.S. PATENT DOCUMENTS

| 5,546,278 | A  | * | 8/1996  | Bethurum ...................... 361/737 |
| 5,675,319 | A  |   | 10/1997 | Rivenberg et al. |
| 6,315,205 | B1 | * | 11/2001 | Bates, III ...................... 235/479 |
| 6,551,131 | B1 | * | 4/2003  | Kuo ............................ 439/541.5 |
| 6,570,772 | B2 | * | 5/2003  | Kawano et al. ................. 361/752 |
| 6,869,302 | B2 | * | 3/2005  | Bricaud et al. ................ 439/326 |
| 7,098,792 | B1 | * | 8/2006  | Ahlf et al. ................... 340/568.1 |
| 2003/0147228 | A1 | * | 8/2003 | Koike et al. .................... 361/801 |
| 2004/0103302 | A1 |   | 5/2004 | Yoshimura et al. |
| 2006/0291155 | A1 | * | 12/2006 | Chen et al. .................... 361/683 |

FOREIGN PATENT DOCUMENTS

| EP | 1 462 907 A1 | 9/2004 |
| FR | 2 815 733 | 4/2002 |
| WO | WO 93/01901 | 2/1993 |
| WO | WO 94/07221 | 3/1994 |
| WO | WO 2004/086202 A1 | 10/2004 |

* cited by examiner

*Primary Examiner* — Thien M. Le
*Assistant Examiner* — April Taylor
(74) *Attorney, Agent, or Firm* — Blakely, Sokoloff, Taylor & Zafman

(57) ABSTRACT

The invention relates to an access-protection device for an electronic card, including a flexible circuit (2) that comprises an electrically conductive track (21) in the shape of a mesh connected to processing means of the electronic card, a guide (3) around which the flexible circuit (2) is arranged and for maintaining the flexible circuit (2) in position, and a protection hood (4) provided about the assembly comprising the guide (3) and the flexible circuit (2), wherein said access-protection device can be configured to be installed in an area of the card to be protected.

10 Claims, 4 Drawing Sheets

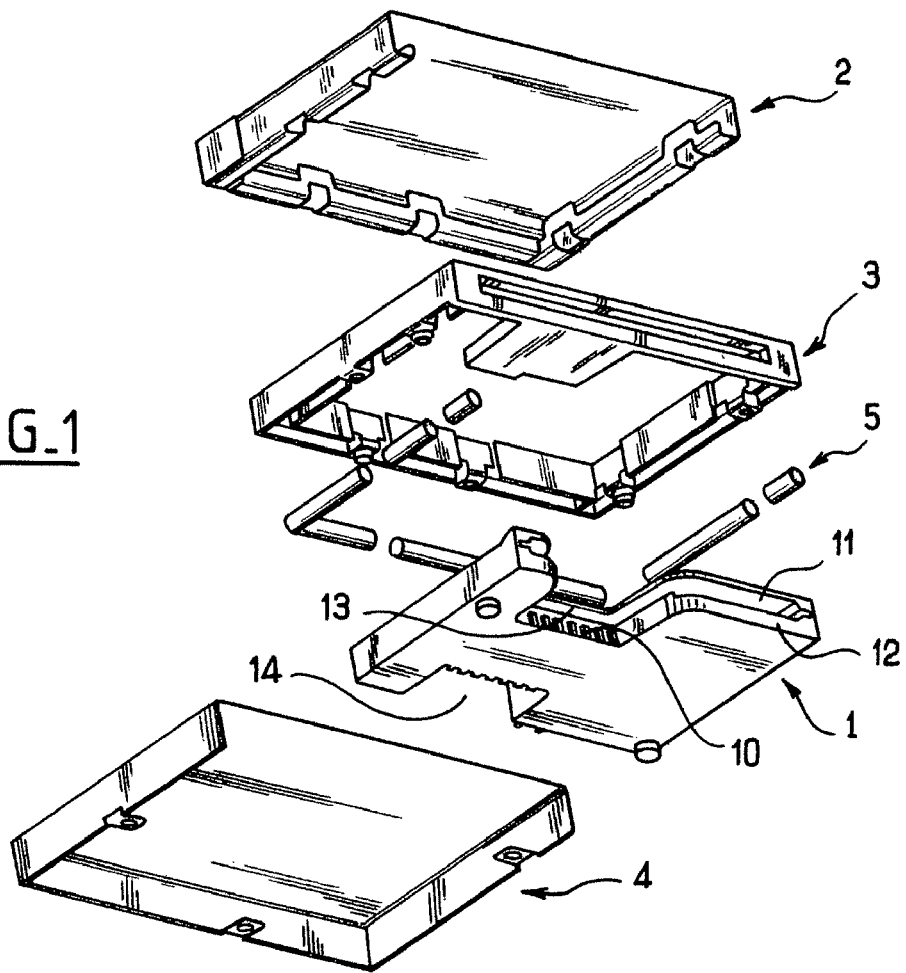
FIG_1
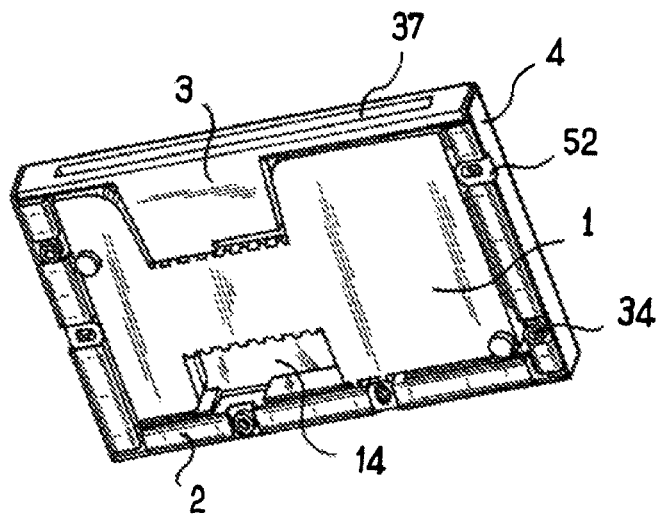
FIG_2

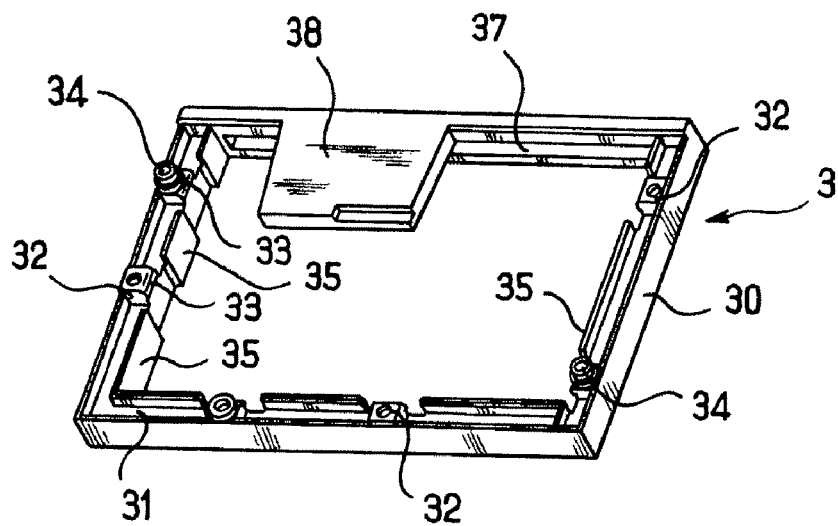
FIG_3
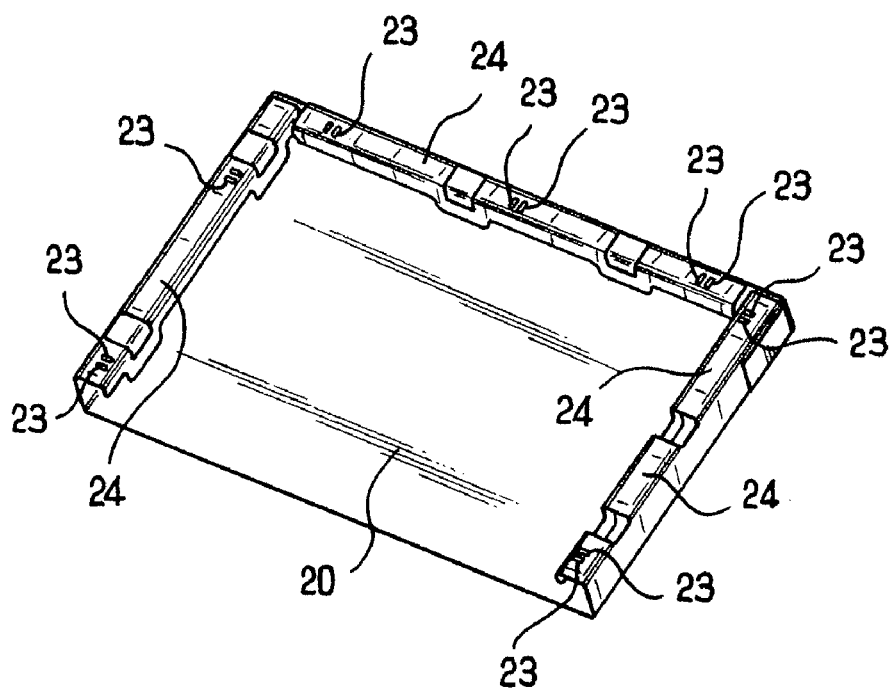
FIG_5

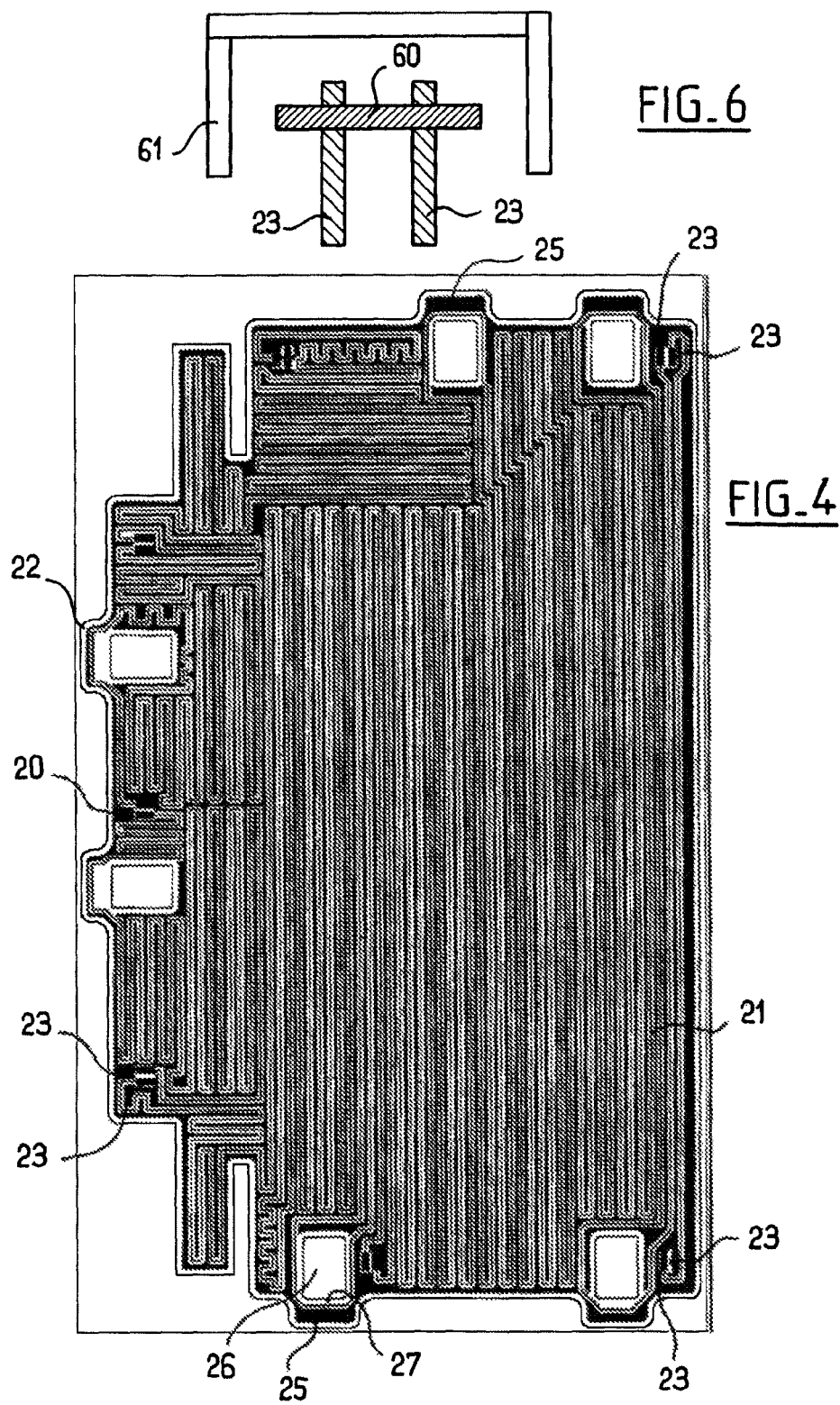

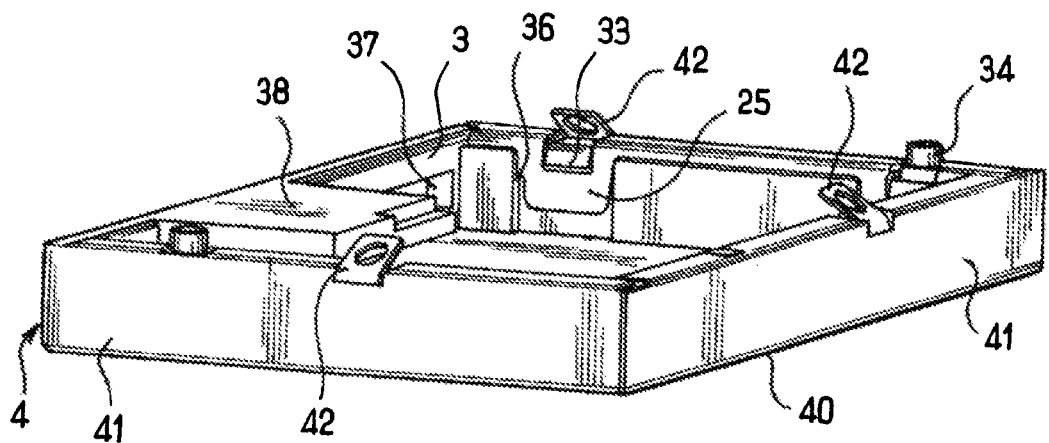
FIG_7
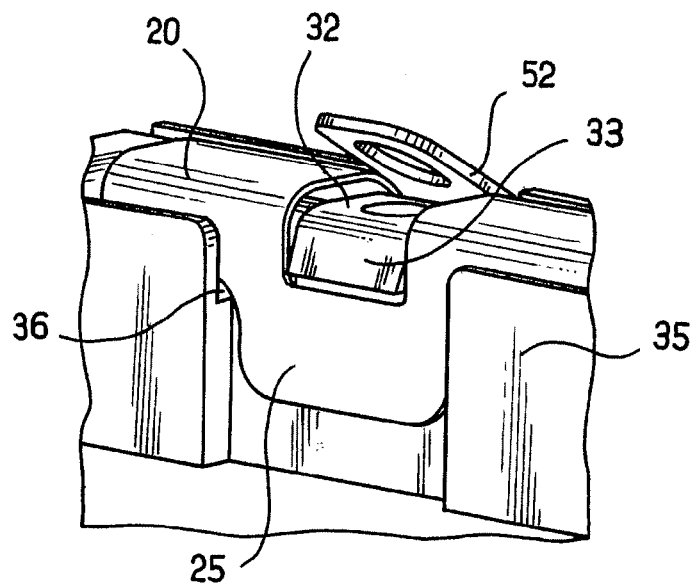
FIG_8

PROTECTION DEVICE FOR AN ELECTRONIC CARD

This is a non-provisional application claiming the benefit of International application number PCT/EP2007/060471 filed Oct. 2, 2007.

The present invention concerns the general technical area of protection against intrusions into terminals containing confidential data.

It is particularly adapted to payment terminals which must ensure a certain security level to prevent non-authorized access to an electronic card of the terminal, and more particularly to confidential data transiting on a region of this electronic card.

GENERAL DESCRIPTION OF THE CONTEXT AND PRIOR ART

Solutions have already been put forward to guarantee the security of terminals comprising an electronic card, on a region of which confidential data transits or are stored in memory.

One first known solution consists of protecting the electronic card of the terminal with a metal cover. This increases the difficulty for an ill-intentioned third-party to access the electronic card of the terminal containing confidential data.

However, this solution only amounts to a mechanical protection which, once removed, does not prevent a third party from having access to the region of the electronic card to be protected.

Improved devices to protect the electronic card of the terminal have therefore been proposed, which comprise means to detect attempted intrusion.

In particular, devices are known which can detect attempted opening of the protective cover, this detection by the processing means of the terminal leading to activation of anti-fraud functions of the terminal, such as placing the terminal out of order for example.

Document EP 1 462 907 describes said device with which to detect opening of the protective cover of the terminal's electronic card, and to activate the terminal's anti-fraud functions.

The device described in document EP 1 462 907 comprises a cover in plastic or ceramic, and an electrically conductive trace in a layer of the cover.

The electrically conductive trace is linked to the terminals of the processing means so as to close an electric detection circuit.

Any attempted access by a third party, by drilling, cutting or pulling off the cover for example, leads to sectioning of the electrically conductive trace.

Sectioning of the electrically conductive trace leads to opening of the electric detection circuit.

Such opening is detected by the processing means which activate the terminal's anti-fraud functions.

One drawback with this type of device is that it is costly and is difficult to implement.

One purpose of the present invention is to propose an improved protection device against intrusions into terminals containing confidential data.

DESCRIPTION OF THE INVENTION

For this purpose an anti-intrusion device for electronic card is proposed which comprises:

a flexible circuit comprising an electrically conductive track in the shape of a mesh connected to processing means of the electronic card, a supporting guide for the flexible circuit to maintain the flexible circuit in position, a protective cover capping the assembly consisting of the guide and flexible circuit, the anti-intrusion device being configured to be arranged in a region of the electronic card to be protected.

Other preferred, but non-limiting aspects of the anti-intrusion device of the invention are the following, taken either alone or in combination:

the cover comprises means enabling the anti-intrusion device to be disengaged from the electronic card in response to attempted opening of the fastening means of the device in the region of the electronic card to be protected, the means enabling disengagement of the anti-intrusion device comprise elastic shape memory tabs returning to shape on unscrewing, the guide comprises a frame, the region to be protected comprises a chip card connector, the guide comprising means to protect the pins of the connector on which confidential data can be accessed, the means to protect the pins comprise a rectangular projection extending towards the centre of the frame, the flexible circuit comprises at least one tongue, the guide comprises means to retain the flexible circuit, the guide comprises means to rip the flexible circuit in response to a traction force thereupon, the retaining and ripping means of the flexible circuit comprise a rectangular pad which, on its side facing the centre of the frame, comprises a lug which cooperates with one edge of a lumen adjacent the tongue of the flexible circuit, the flexible circuit comprises at least two electrically conductive connection lines, and the electronic card comprises at least one electrically conductive bridge, the bridge being arranged on the electronic card so that it comes into contact with the two connection lines when the anti-intrusion device is arranged in the region of the electronic card to be protected, the electronic card further comprises a secondary electrically conductive trace that is earthed and arranged around the bridge.

DESCRIPTION OF THE FIGURES

Other characteristics, purposes and advantages of the present invention will become further apparent from the following description which is solely illustrative and non-limiting, and is to be read with reference to the appended drawings in which:

FIG. 1 is an exploded, perspective view of the anti-intrusion device according to the invention, FIGS. 2 and 7 illustrate a perspective view of the anti-intrusion device once it has been assembled, FIG. 3 is a perspective view of a guide of the anti-intrusion device, FIG. 4 is an overhead view of a flexible circuit of the anti-intrusion device, FIG. 5 is a perspective view of the flexible circuit, FIG. 6 is a diagram schematizing a portion of the flexible circuit and of the electronic card to be protected, FIG. 8 is a perspective view of one portion of the anti-intrusion device.

DESCRIPTION OF THE INVENTION

With reference to FIG. 1, this illustrates an exploded, perspective view of the anti-intrusion device according to the invention.

This anti-intrusion device is intended to be arranged in a region to be protected of an electronic card.

In the embodiment illustrated in FIG. 1, the anti-intrusion device provides protection to a chip card connector 1 arranged on an electronic card (not shown) and in which a user inserts a chip card to carry out a payment operation for example.

When the chip card is inserted in the connector, confidential data on the chip card is read by reading means of the connector 1. This confidential data is then sent to input/output pins 10 of the connector 1 linked to ciphering means (not shown).

The ciphering means are used to cipher the confidential data read by the reading means of the connector 1. This data, once ciphered, is transferred to other means of the electronic card.

Therefore at the connector 1, and more particularly at the input/output pins 10 of the connector 1, the confidential data is not ciphered and is therefore accessible to an ill-intentioned third party who may place spies at these input/output pins 10.

The anti-intrusion device described below can be used to protect access to the connector 1 and in particular to the input/output pins 10.

As illustrated in FIG. 1, the anti-intrusion device comprises a flexible circuit 2, a guide 3, a cover 4 and an elastic seal 5.

The guide 3 is intended to receive the chip card connector 1 to be protected.

The flexible circuit 2 is intended to cover the guide 3.

The cover 4 is intended to cap the flexible circuit 2.

The elastic seal 5 is intended to be arranged between the guide 3 and the flexible circuit 2.

The anti-intrusion device thus assembled, such as illustrated in FIG. 2, is then fastened onto the electronic card by fastening means.

The fastening means comprise fastening screws and any other known means to allow the contacting of the anti-intrusion device onto the electronic card (outer box of the end product for example, etc).

The Connector 1:

The connector 1 is a rectangular parallelepiped shape.

The connector 1 comprises a longitudinal slot 11 on one 12 of its longitudinal edges.

The connector 1 comprises two cut-outs 13, 14 on its longitudinal edges.

The cut-out 13 of the connector arranged on the side of the longitudinal slot 11 comprises pins 10 to be protected on which confidential data of the chip card is accessible in deciphered form.

The Guide 3:

The guide 3 acts as support for the flexible circuit 2: the flexible circuit 2 is arranged around the guide 3. The guide 3 is used to hold the flexible circuit 2 in position.

The guide 3 comprises means to retain and to rip the flexible circuit 2.

The guide 3 also comprises means to ensure contact pressure of the anti-intrusion device on the electronic card, and for holding it in position.

The guide 3 further comprises means to centre the anti-intrusion device on the electronic card.

The guide 3 further comprises means to guide the elastic seal 5.

The guide 3 further comprises protection means for the pins 10 of the connector 1 to be protected.

As illustrated in FIG. 3, the plastic guide 3 comprises a frame 30 extending over a plane.

For reasons of clarity, this plane will be defined in the remainder hereof as a horizontal plane. Also for reasons of clarity, in the remainder hereof, the sides of the edges of the frame 30 intended to lie facing the electronic card will be defined as the undersides of the edges of the frame 30.

The guide 3 is in plastic for example, to facilitate its manufacture by moulding.

The guide 3 comprises a longitudinal slot 37 on one of the longitudinal edges of the frame 30.

The edge of the frame 30 comprising the longitudinal slot 37 also comprises a rectangular projection 38 extending towards the centre of the frame 30, parallel to the underside of the edge of the frame 30 and in the continuation thereof. The rectangular projection 38 is intended to cover the cut-out 13 of the connector 1 comprising the pins 10 to be protected. The protection means for the pins of the connector 1 comprise the rectangular projection 38.

The frame 30 comprises a groove 31 on the undersides of the three edges of the frame 30 other than the edge comprising the longitudinal slot 37. The groove is intended to receive the elastic seal 5. The guide means for the elastic seal comprise the groove 31.

The guide 3 further comprises pads 32 on the undersides comprising the groove 31. The pads 32 project towards the centre of the frame 30. Each pad 32 is of rectangular shape and, on its side facing the centre of the frame 30, comprises a lug 33. These lugs are used to rip an electrically conductive trace 21 of the flexible circuit 2 in the event that a pulling force is exerted on it. Each lug is intended to come into contact with one edge 27 of a lumen adjacent a tongue 25, as will be explained below. The retaining and ripping means of the flexible circuit 2 comprise the lugs 33.

The guide 3 comprises at least one tenon 34 arranged on at least one pad 32. In the embodiment illustrated in FIG. 3, the guide 3 comprises two tenons 34. Each tenon 34 is intended to adjust itself inside a corresponding mortise (not shown) provided on the electronic card. The tenons 34 and mortises enable facilitated positioning and centring of the anti-intrusion device on the electronic card. The means to centre the anti-intrusion device on the electronic card comprise the tenons 34.

The pads 32 and tenons 34 each comprise a threaded hole intended to receive the screw-thread of a fastening screw to allow fastening of the guide 3 onto the electronic card. The means enabling ensured contact pressure and the holding in position of the anti-intrusion device on the electronic card comprise the threaded holes and fastening screws.

The guide 3, on the inner wall of the frame 30, comprises wings 35 which extend perpendicular to the horizontal plane and parallel to the inner wall of the frame 30. The wings 35 are arranged on the three edges of the frame 30 other than the edge comprising the longitudinal slot 37. Each wing 35 is positioned between two pads 32. The wings 35 do not project from the frame 30; they stop at the undersides of the edges of the frame 30.

The guide 3 further comprises a slot 36 between each wing 35 and the inner wall of the frame 30. The slot 36 is intended to receive the edge of the flexible circuit 2 and facilitates the positioning and holding in position of the flexible circuit 2. The retaining means of the flexible circuit also comprise the wings 35.

The lengths of the longitudinal and transverse edges of the frame 30 are designed to be sufficient to allow reception of the connector 1 inside the frame 30.

The Flexible Circuit 2:

The flexible circuit comprises a flexible sheet 20 in which the electrically conductive trace 21 is arranged. The electrically conductive trace 21 is in copper for example.

The sheet 20 comprises tongues 25 arranged so as to come into contact with the inner wall of the frame 30, between two wings 35, when the anti-intrusion device is assembled.

Each tongue 25 comprises a lumen 26 arranged so that it lies directly above a pad 32 of the guide 3 when the anti-intrusion device is assembled.

The edge adjacent the tongue 25 is intended to come into contact with the lug 33 of the pad 32 located directly above the lumen 26.

In the embodiment illustrated in FIG. 4, the electrically conductive trace 21 is lattice shaped. In the meaning of the present invention by "lattice" is meant a crenulated pattern such as illustrated in FIG. 4 or a spiral shape.

The electrically conductive trace 21 is connected to the terminals of processing means (not shown) of the electronic card e.g. a microprocessor. The electrically conductive trace 21 forms a security line linked to the processing means 34.

The processing means 34 are adapted to determine whether or not their terminals are electrically connected, for example by measuring the resistance of the electrically conductive trace 21.

When an individual attempts to access the connector 1 by removing the anti-intrusion device, the electrically conductive trace is no longer in contact with the terminals of the processing means of the electronic card.

The processing means detect a change in the resistance of the electrically conductive trace 21, indicating that attempted opening of the device is taking place, and they set anti-fraud functions in operation such as placing the electronic card out of order for example.

The electrically conductive trace 21 travels through each tongue 25. This can ensure sectioning of the electrically conductive trace 21 subsequent to tearing of the flexible circuit 2 by the lugs 33 in the event of a pulling force on the flexible circuit 2.

The electrically conductive trace 21 consists of separate portions of trace line which are linked via bridges 60 arranged on the electronic card.

Each portion of the electrically conductive trace is connected to two connection lines 23 arranged on one side of the sheet 20. These connection lines 23 are located in an area 24 intended to come to lie facing the electronic card.

The flexible circuit 2 is effectively intended to be arranged around the guide 3. Therefore an area 24 of one of the sides of the flexible sheet 20 is in contact with the electronic card once the anti-intrusion device is assembled. This area 24 is illustrated in FIG. 5.

The reader will have understood that the connection lines 23 and the electrically conductive trace 21 extend over different planes.

As illustrated in FIG. 6, two adjacent trace portions are connected via a respective bridge 60 located on the electronic card and which is intended to come into contact with the connection lines 23 of the two adjacent trace portions when the anti-intrusion device is assembled.

The fact that the electrically conductive trace 21 consists of separate trace portions closed by electrically conductive bridges 60 when the anti-intrusion device is assembled, allows any attempted intrusion to be detected whether intrusion is by removing the anti-intrusion device or by lifting one side of the anti-intrusion device.

Each bridge 60 is protected by a secondary trace 61 located on the electronic card and earthed.

The secondary trace 61 is arranged around the bridge 60. This allows a short circuit to be detected in the event of attempted intrusion by inserting a metal object between the anti-intrusion device and the electronic card, and maintains contact between the connection lines of two adjacent trace portions.

Since it is wound around the guide 3, the flexible circuit 2 forms a protective wall for the connector 1.

The use of a flexible circuit 2 allows a wide choice of fabrication technologies in order to adapt to the desired security level and acceptable cost for the protection function of the anti-intrusion device.

For example, in one embodiment, the flexible circuit 2 is made of silver ink with an electrically conductive trace 21 having a section of 0.5 millimeters and a distance of 0.5 millimeters between two adjacent portions of the electrically conductive trace 21.

In another embodiment, the flexible circuit 2 is made in copper polyester with an electrically conductive trace 21 having a section of 0.2 millimeters and a distance of 0.2 millimeters between adjacent portions of the electrically conductive trace 21.

In another embodiment, the flexible circuit is made in Capton which allows fabrication of an electrically conductive trace 21 having a section in the order of one tenth of a millimeter and a distance of the order of one tenth of a millimeter between adjacent portions of the electrically conductive trace 21.

The Cover 4:

The cover is notably illustrated FIGS. 7 and 8. The cover 4 is intended to cap the assembly consisting of the guide 3, the flexible circuit 2 and the connector 1.

Preferably, the flexible circuit 2 lies flat against the cover 4. In this way it is difficult to deteriorate the cover 4 without deteriorating the flexible circuit 2 and more particularly the electrically conductive trace 21.

The cover 4 is a rectangular parallelepiped. It comprises a first plate 40 extending parallel to the horizontal plane and four plates 41 arranged perpendicular to the first plate 40 so as to form a rectangular parallelepiped.

The cover 4 preferably consists of a hard material such as metal to increase difficulty for any intrusion, in particular by piercing.

The fact that the cover 4 consists of a hard material means that, in the event of any attempted intrusion by piercing, the drill bit will damage the flexible circuit 2 lying against the cover 4.

It is effectively difficult when piercing a hard surface to come to a stop immediately after this surface.

The cover comprises means allowing the anti-intrusion device to become disengaged from the electronic card further to unscrewing of the fastening screws. This allows detection of any attempted unscrewing of the anti-intrusion device.

Once assembled, the anti-intrusion device is effectively fastened onto the electronic card by means of fastening screws. During said fastening, the connection lines of the trace portions come into contact with the respective bridges arranged on the electronic card. At the same time, the connection line is connected to the terminals of the processing means so as to allow detection of any opening of the closed circuit formed by the processing means and the electronic trace.

The terminal is then activated by authorized operators.

On unscrewing of a fastening screw, the means allowing disengagement of the anti-intrusion device tend to move the anti-intrusion device with respect to the electronic card.

The means enabling disengagement of the anti-intrusion device comprise at least one elastic tab 42 which returns to shape on unscrewing. In the embodiment illustrated FIGS. 7 and 8, the means enabling disengagement of the anti-intrusion device comprise three tabs arranged on the two side edges and a longitudinal edge of the cover. Also, in this embodiment, the tabs are of rectangular shape.

The elastic tabs 42 are intended to come to lie opposite the pads 32 of the guide 3 when the anti-intrusion device is assembled.

Each elastic tab 42 comprises a through hole 43 intended to lie opposite the threaded hole of the corresponding pad 32.
The Elastic Seal 5:

The elastic seal 5 is used to ensure contact of the connection lines 23 of the flexible circuit 2 on the electronic card: when the fastening screws are tightened, the guide 3 comes to compress the elastic seal 5 which itself applies pressure on the flexible circuit 2 thereby ensuring good contact between the connection lines and the bridges 60 of the electronic card.

The elastic properties of the elastic seal also serve as a spring enabling the anti-intrusion device to be disengaged from the electronic card on unscrewing.

The elastic seal 5 avoids having to use vertical inter-connectors e.g. those of zebra type.

The elastic seal 5 consists of a plurality of seal portions intended to be arranged in the groove 31 of the guide 3.

In one embodiment, the elastic seal 5 is replaced by flexible plastic strips fabricated in the same piece as the guide 3.
The Anti-Intrusion Device:

The anti-intrusion device can protect a chip card connector arranged on an electronic card against ill-intentioned third persons.

The anti-intrusion device has the advantage of:
allowing detection of any attempted intrusion involving the hooking/soldering of the pins of the connector using a wire,
allowing detection of any attempted intrusion which attempts to render the electrically conductive lattice-shape trace ineffective by setting-up a short circuit between the input and output of the electrically conductive trace,
allowing protection of the fastening screws,
offering a good ratio between the level of protection obtained and the cost of fabrication of the anti-intrusion device,
avoiding the use of vertical inter-connectors,
allowing easy maintenance for persons authorized to conduct operations on the electronic card.

The reader will appreciate that numerous modifications may be made to the anti-intrusion device without departing materially from the teaching of this document. For example, the electrically conductive trace may comprise two or more than two trace portions. The number of bridges on the electronic card may vary in relation to the number of trace portions forming the electrically conductive trace 21.

REFERENCES

1 connector,
10 connector pin,
11 longitudinal slot of the connector,
12 longitudinal edge of the connector,
13, 14 cut-outs,
2 flexible circuit,
20 sheet,
21 electrically conductive trace,
22 secondary trace,
23 connection line,
24 area,
25 tongue,
26 lumen,
27 edge of lumen adjacent to the tongue,
3 guide,
30 frame,
31 groove,
32 pad,
33 lug,
34 tenon,
35 wing,
36 slot,
37 longitudinal slot,
38 rectangular tab,
4 cover,
40, 41 plate,
42 elastic tab,
43 opening,
5 elastic seal,
60 bridge,
61 secondary trace.

The invention claimed is:

1. An anti-intrusion device for electronic card, comprising:
a flexible circuit comprising an electrically conductive track in the shape of a mesh connected to processing means of the electronic card,
a guide supporting the flexible circuit allowing the flexible circuit to be maintained in position,
a protective cover capping an assembly consisting of the guide and the flexible circuit,
the anti-intrusion device being configured to be arranged in a region of the electronic card to be protected,
wherein the protective cover comprises elastic shape memory tabs returning to shape on unscrewing fastening screws, enabling disengagement of the anti-intrusion device from the electronic card in response to unscrewing of fastening screws of the anti-intrusion device.

2. The anti-intrusion device according to claim 1, wherein the guide comprises a frame.

3. The anti-intrusion device according to claim 1, wherein the region to be protected comprises a chip card connector, the guide comprising protection means to protect pins of the chip card connector on which confidential data is accessible.

4. The anti-intrusion device according to claim 3, wherein the protection means of the pins comprise a rectangular tab extending towards the center of the frame.

5. The anti-intrusion device according to claim 1, wherein the flexible circuit comprises at least one tongue.

6. The anti-intrusion device according to claim 1, wherein the guide comprises retaining means to retain the flexible circuit.

7. The anti-intrusion device according to claim 1, wherein the guide comprises ripping means to rip the flexible circuit in response to traction thereupon.

8. The anti-intrusion device according to claim 1, wherein a retaining means and a ripping means of the flexible circuit comprise a rectangular pad which, on its side facing the center of the frame, comprises a lug cooperating with one edge of a lumen adjacent a tongue of the flexible circuit.

9. The anti-intrusion device according to claim 1, wherein the flexible circuit comprises at least two electrically conductive connection lines, and the electronic card comprises at least one electrically conductive bridge, the bridge being arranged on the electronic card so as to come into contact with the two electrically conductive connection lines when the anti-intrusion device is arranged in the region of the electronic card to be protected.

10. The anti-intrusion device according to claim 9, wherein the electronic card further comprises a secondary electrically conductive trace that is earthed and arranged around the bridge.

* * * * *